United States Patent
Barker et al.

(10) Patent No.: US 9,222,457 B2
(45) Date of Patent: Dec. 29, 2015

(54) WAVE ENERGY CONCENTRATION USING WATER WAVE BAND GAP STRUCTURE WITH DEFECT CAVITIES

(71) Applicant: Raytheon Company, Waltham, MA (US)

(72) Inventors: Delmar L. Barker, Tucson, AZ (US); Darrick M. Buban, Tucson, AZ (US); Michael J. Broyles, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 315 days.

(21) Appl. No.: 13/797,417

(22) Filed: Mar. 12, 2013

(65) Prior Publication Data

US 2014/0260236 A1    Sep. 18, 2014

(51) Int. Cl.
*F03B 13/16*    (2006.01)
*E02B 9/08*    (2006.01)
*F03B 13/14*    (2006.01)

(52) U.S. Cl.
CPC . *F03B 13/16* (2013.01); *E02B 9/08* (2013.01); *F03B 13/14* (2013.01); *F05B 2240/131* (2013.01); *Y02E 10/38* (2013.01)

(58) Field of Classification Search
CPC ......... Y02E 10/38; F03B 13/16; F03B 13/18; F03B 13/14; F03B 13/22; E02B 9/08; E04H 4/0006
USPC .................... 60/497, 502; 405/79, 76; 290/53
See application file for complete search history.

(56) References Cited

U.S. PATENT DOCUMENTS

| | | | | | |
|---|---|---|---|---|---|
| 4,073,142 | A | * | 2/1978 | Tornabene | 60/502 |
| 4,255,066 | A | * | 3/1981 | Mehlum | 405/76 |
| 8,082,844 | B1 | * | 12/2011 | Barker et al. | 102/200 |
| 2013/0269508 | A1 | * | 10/2013 | Barker et al. | 89/36.01 |
| 2014/0300110 | A1 | * | 10/2014 | Chao et al. | 290/53 |

* cited by examiner

*Primary Examiner* — Thomas Denion
*Assistant Examiner* — Xiaoting Hu

(57) ABSTRACT

According to embodiment of the disclosure, a wave energy harvesting system comprises a water wave band gap structure (WWBGS) and one or more energy conversion devices. The water wave band gap structure (WWBGS) comprises an array of posts with one or more missing posts that define a defect cavity. The one or more defect cavities are configured to concentrate energy of water waves. The one or more energy conversion devices are positioned in or adjacent to one of the one or more defect cavities and are configured to convert the energy from the water waves into another form of energy.

20 Claims, 4 Drawing Sheets

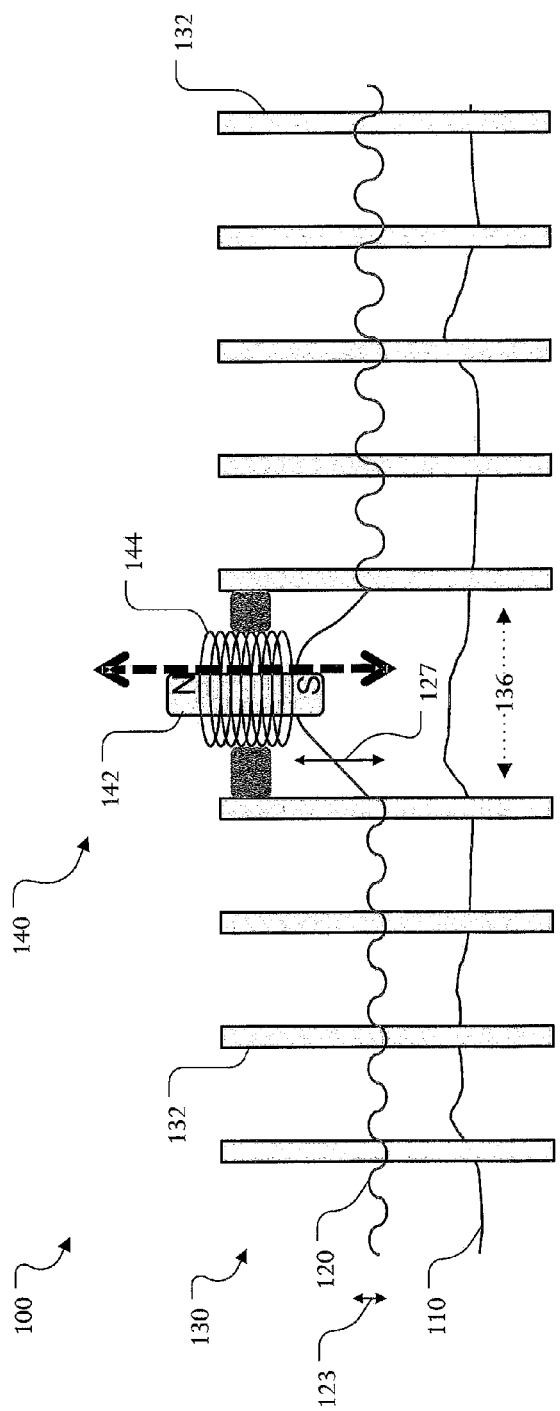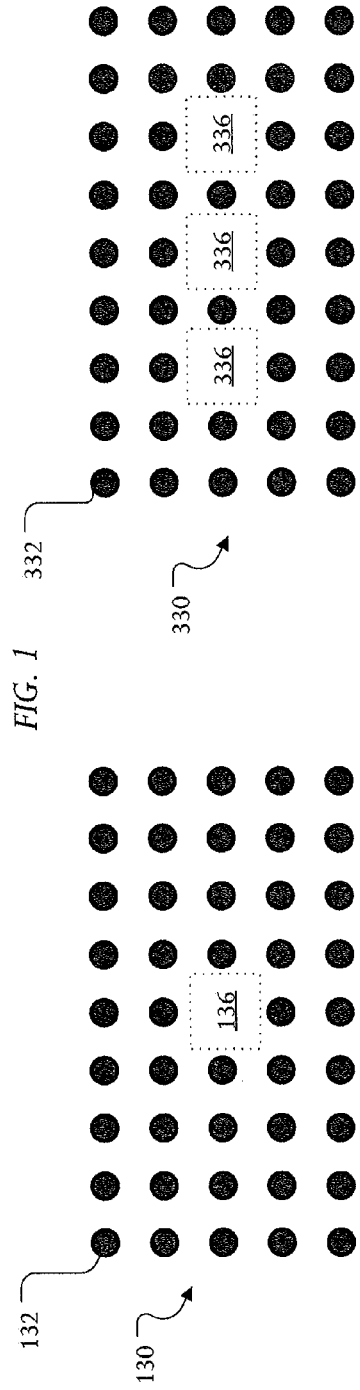

WAVE ENERGY CONCENTRATION USING WATER WAVE BAND GAP STRUCTURE WITH DEFECT CAVITIES

TECHNICAL FIELD

This disclosure is generally directed to systems that convert energy from one form to another. More specifically, this disclosure is directed to wave energy concentration using a water wave band gap structure with defect cavities.

BACKGROUND

A variety of conventional techniques exist for converting energy in water waves to other forms of energy. One example involves a deep water structure that includes one portion that is rigidly tethered to the floor of the ocean and another buoy portion that oscillates with ocean waves. As one structure moves and the other doesn't, electrical energy can be harnessed from the water, for example, using generator coils and a magnet.

SUMMARY

This disclosure provides wave energy concentration using a water wave band gap structure with defect cavities.

According to embodiment of the disclosure, a wave energy harvesting system comprises a water wave band gap structure (WWBGS) and one or more energy conversion devices. The WWBGS comprises an array of posts with one or more missing posts that define a defect cavity. The one or more defect cavities are configured to concentrate energy of water waves. The one or more energy conversion devices are positioned in or adjacent to one of the one or more defect cavities and are configured to convert the energy from the water waves into another form of energy.

Certain embodiments may provide various technical advantages depending on the implementation. For example, a technical advantage of some embodiments may include enabling the conversion of energy from water waves that are otherwise incapable of being efficiently converted due to low amplitudes. A technical advantage of other embodiments may include the capability to increase the amplitude of water waves by a factor of four and/or increase energy concentration by a factor of two and a half. A technical advantage of yet other embodiments may include the capability to increase the amplitude of water waves by a factor of more than four and/or increase energy concentration by a factor of more than two and a half by, among other things, tuning the inner post of the cavity. Yet another technical advantage may include the capability to allow the conversion of energy from water waves in ponds, lakes, and man-made water facilities. Still yet another technical advantage may include the providing of a low-tech solution for harnessing energy from water waves.

Although specific advantages are above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which:

FIGS. 1 and 2 illustrate views of a wave energy harvesting system, according to an embodiment of the disclosure;

FIG. 3 shows a water wave band gap structure, according to an embodiment of the disclosure;

DETAILED DESCRIPTION

Figure 4A:
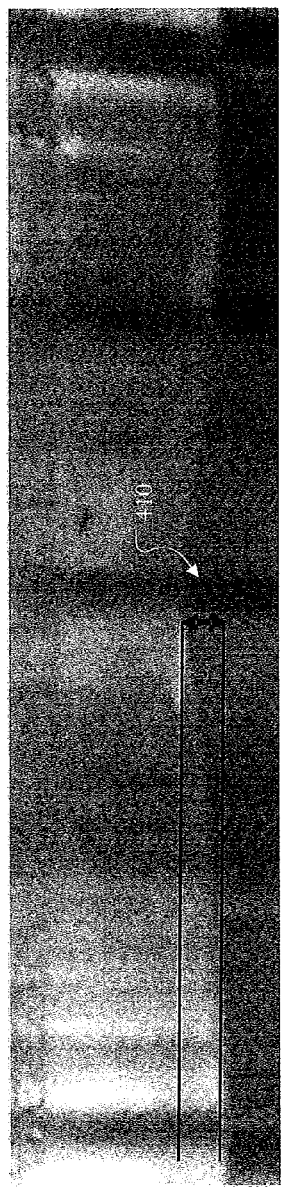
FIGS. 4A and 4B illustrate an experiment that shows how wave amplitudes increase with the introduction of a defect cavity into a water wave band gap structure.

The FIGURES, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

A variety of conventional techniques exist for converting energy in water waves to other forms of energy. One example involves a deep water structure that includes one portion that is rigidly tethered to the floor of the ocean and another buoy portion that oscillates with ocean waves. As one structure moves and the other doesn't, electrical energy can be harnessed from the water, for example, using generator coils and a magnet.

There are a variety of problems with such conventional techniques. For example, they can only be utilized in limited areas, namely areas where there are massive waves with high amplitudes such as deep water scenarios or near an ocean shore. Additionally, the capital outlay for such structures may be high. Specifically, because of their location, such conventional structures require technology that can withstand destructive factors such as heavy storms and corrosion. Moreover, the installation and operational costs of such conventional devices can be cost-prohibitive.

Given concerns with conventional techniques, certain embodiments disclose techniques for converting wave power in environments with small amplitude water waves. Non-limiting examples include lakes, ponds, and man-made water areas. Particular embodiments allow the conversion of energy in water waves to other forms of energy using amplitudes that are five to ten times smaller than conventional techniques. Additionally, certain embodiments disclose inexpensive manners of converting energy in water waves.

As further disclosed herein, according to certain embodiment, a water wave band gap structure (WWBGS) has one or more defect cavities that concentrate water waves—large and small. By concentrating such wave energy in the defect cavity, the amplitude of the yielded water wave is increased. According to certain embodiments, the amplitude in the area of the defect cavity may be four times as high as the nominal amplitude of water surrounding the WWBGS. Additionally, in certain embodiments, there may be a multifold increase of wave energy concentration. For example, in one particular embodiment, there is a 2.6 times increase in wave energy concentration.

As also disclosed herein, according to certain embodiments, the WWBGS may be a low-tech, cost efficient solution that can be deployed in a variety of military and domestic locations—including natural man-made small wave environments.

FIGS. 1 and 2 illustrate views of a wave energy harvesting system 100, according to an embodiment of the disclosure.

FIG. 1 shows a side view of the wave energy harvesting system 100 whereas FIG. 2 shows a top view of portions of the wave energy harvesting system 100. FIGS. 1 and 2 and other FIGURES herein are primarily intended as describing certain principles of operation. After reviewing this disclosure, one of ordinary skill in the art will recognize that a variety of modifications can be made.

The wave energy harvesting system 100 of FIGS. 1 and 2 includes a water wave band gap structure (WWBGS) 130 with an energy conversion device 140 mounted thereto. The energy conversion device 140 is generally configured to take one form of energy (e.g., mechanical energy) and convert it into another (e.g., electricity). In the embodiment of FIGS. 1 and 2, the energy conversion device 140 is shown as a magnet 142 moving with respect to a coil 144 (or vice versa), which generates electrical energy in a manner that will become apparent to one of ordinary skill in the art after having read this disclosure. Although particular details and a particular energy conversion device 140 has been shown in FIGS. 1 and 2, a variety of other types of energy conversion devices 140 may utilized in other embodiments.

Additionally, although electricity is described as one form of harvested energy, other embodiments may harvest energy in other forms, including stored energy. For example, in other embodiments, the energy conversion device 140 may charge a battery to store energy. In other embodiments, the energy conversion device 140 may pressurize a fluid in a container or containers, which is also a form of stored energy. In yet other embodiments, the harvested energy may immediately be used, for example, in a pump. In certain of such embodiments, mechanical energy may be directly yielded in the pump to move appropriate components.

The WWBGS 130 includes a plurality of posts 132 that have been placed in a bed 110 of a body of water. In particular embodiments, the body of water may be a pond, a river, or a lake. In other embodiments, the body of water may be an natural or man-made (structure. The body of water includes waves, generally depicted as having amplitude indicated by arrows 123. In particular configurations, the amplitude indicated by arrows 123 may be too small for suitable conversion of energy. Therefore, the WWBGS 130, according to certain embodiments, allows the ability to harvest energy from the nominal water waves. In other embodiments, the WWBGS may take nominal water waves from which energy is harvestable and enhance the harvesting of energy from such waves.

The WWBGS 130 is missing a post 132 and thus has a defect cavity therein, which is indicated by dashed lines 136. In certain configurations, the posts 132 may have a periodic structure with substantially equal distances between different posts, for example as seen in FIG. 1. Although shown in various rows and columns, in other configurations, the WWBGS 130 may be circumferentially arranged and/or staggered (e.g., arranged in multiple dimensions). Yet other configurations will become apparent to one of ordinary skill in the art after reading this disclosure.

The posts 132 may be constructed from virtually any material that is capable of reflecting water waves. Although the posts 132 are shown in a circular, columnar type configuration in FIGS. 1 and 2, in other embodiments, the posts 132 may be square, triangular or other shapes. Additionally, in particular embodiments, the posts may not be solid. Rather, in such embodiments the posts can be porous structures such as a metal screen wrapped into a cylinder or a square. In such embodiments, part of the waves may be reflected and part absorbed or transmitted as described more fully below.

In operation, as the waves hit the posts 132, the waves undergo the phenomena of Braggs scattering. Specifically, the energy of a water wave undergoes constructive (and deconstructive) interference with other waves upon reflection from each respective post 132. Although described as reflecting, in particular embodiments, the posts could be screen wire structures that transmit, absorbs some of the wave and reflect a part. This could change the concentrating process in positive ways and is a further analog of how light wave band gaps work. The placement of the defect cavity 136 within the periodic structure of the WWBGS 130 concentrates and releases the energy from constructive water waves—yielding a heightened amplitude wave in the defect cavity 136. As shown in FIG. 1, the concentration of the waver waves of amplitude indicated by arrows 123 (outside the WWBGS) through the posts 132 of the WWGGS 130 yields an amplitude indicated by arrows 127. According to particular embodiments, the amplitude may quadruple in the defect cavity 136. Other embodiments may have more than or less than a quadrupling of amplitude in the defect cavity 136. Such a quadrupling of amplitude yields, according to particular configurations, a 2.6 increase in wave energy concentration in the defect cavity 136. According to other embodiments, the energy concentration may be more than or less than a 2.6 times increase in the defect cavity 136.

Because the amplitude has been greatly increased in the defect cavity 136, the energy generating system 140 may harvest energy from a cyclic translation as the waves moves up and down in the defect cavity 136.

To enhance the concentration of energy within the defect cavity, a variety of different shapes, sizes, and distances between the posts may be chosen. In particular configurations, these shapes and sizes may depend at least partially on an amplitude and frequency of the water waves. According to particular embodiments, post in the WWBGS 130 may handle wavelengths that are ±15% of a center wave length, thus spanning a 30% zone.

By using the WWBGS 130 array shown in FIG. 1, one can see that energy harvesting is independent of the wave direction.

FIG. 3 shows another WWBGS 330, according to an embodiment of the disclosure. The WWBGS 330 operates in a similar manner to the WWBGS 130 of FIGS. 1 and 2 with a plurality of posts 332; however, WWBGS 330 of FIG. 2 includes multiple defect cavities 336 within the periodic WWBGS 330. According to particular embodiments, for a given area, more energy may be harvested with multiple defect cavities 336. An energy generating system (not seen in this FIGURE) may be placed in or proximate to the defect cavities 336.

Although a particular arrangement for multiple defect cavities 336 is shown in FIG. 3, other arrangements may be utilized—some of which are described below.

Figure 4B:
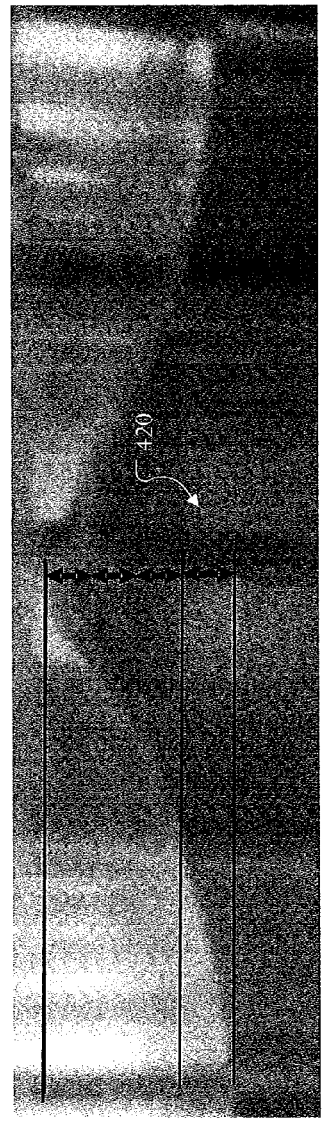

FIGS. 4A and 4B illustrate an experiment that shows how wave amplitudes increase with the introduction of a defect cavity into a WWBGS. The same results were also achieved in simulations. FIG. 4A shows waves in a WWBGS without the defect cavity whereas FIG. 4B shows the WWBGS with the defect cavity. In this particular simulation, the defect cavity increased the wave height four-fold as seen by arrow 410 and arrows 420. As described above, other embodiments may yield an amplitude with more than or less than this increase.

Figure 5:
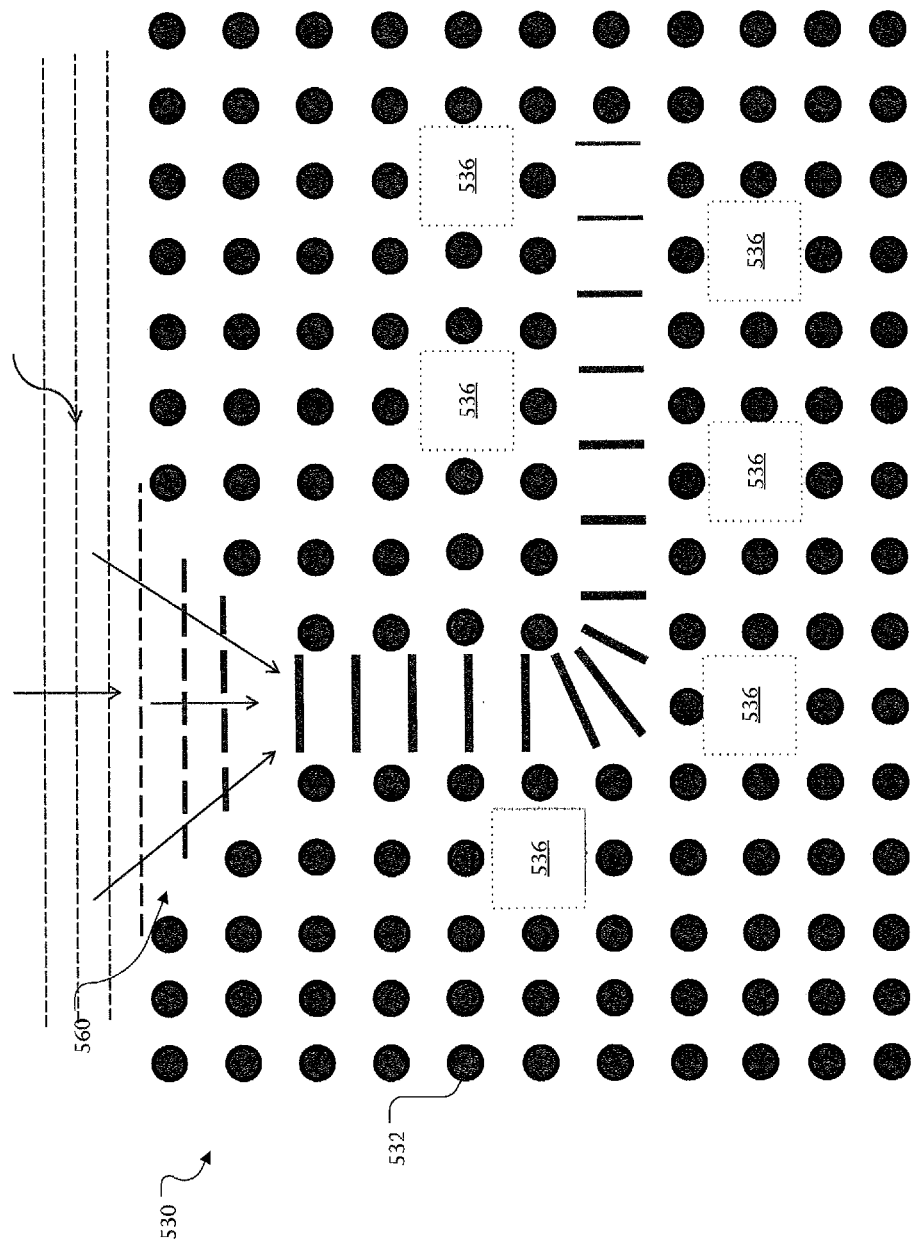
FIG. 5 shows another water wave band gap structure, according to an embodiment of the disclosure.

FIG. 5 shows another WWBGS 530, according to an embodiment of the disclosure. The WWBGS 530 operates in a similar manner to the WWBGS 130 of FIGS. 1 and 2 with a plurality of posts 532; however, WWBGS 530 of FIG. 2 includes multiple defect cavities 536 and a waveguide 560 that directs waves by several defect cavities in order to extract energy. The waveguide 560 may utilize any suitable configuration. Although one particular configuration of a waveguide is shown in FIG. 5, others may be utilized in other embodiments. An energy generating system (not seen in this FIGURE) may be placed in or proximate to the defect cavities 536.

Figure 6:
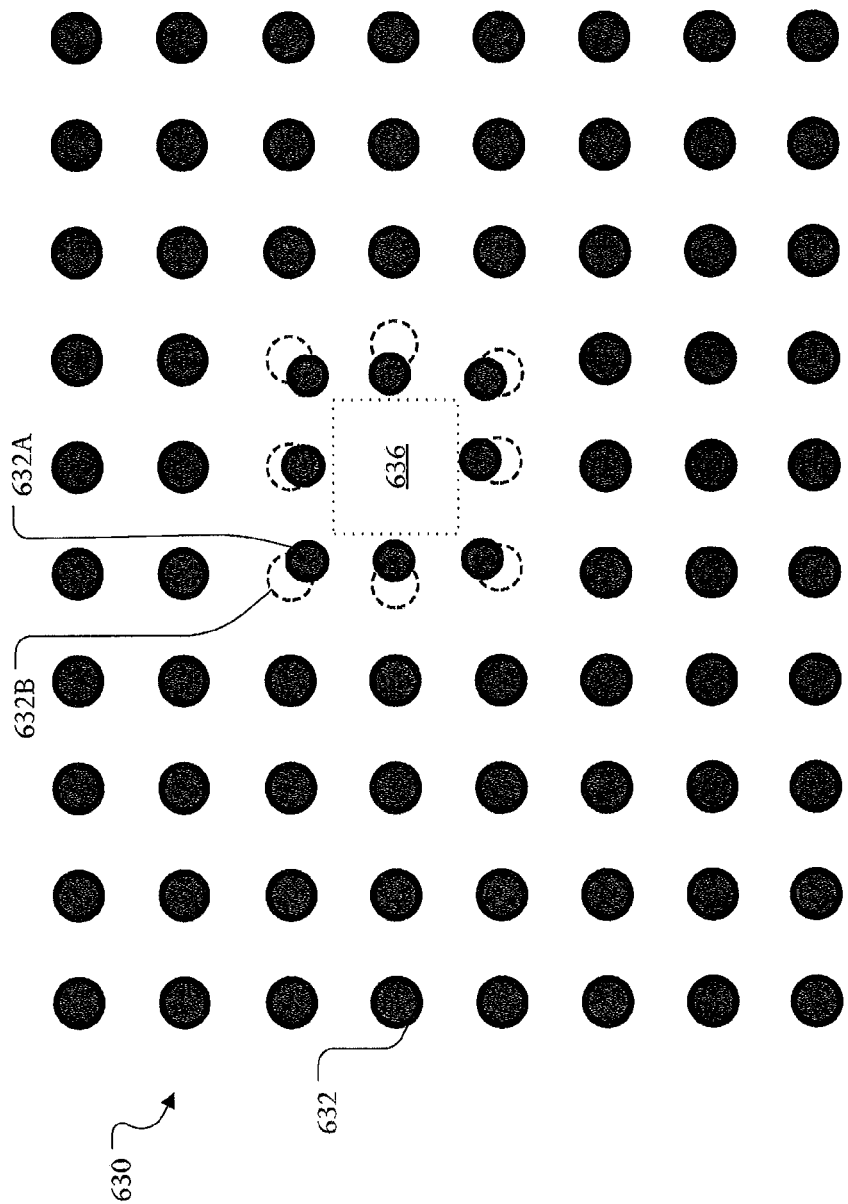
FIG. 6 shows another water wave band gap structure, according to an embodiment of the disclosure.

FIG. 6 shows another WWBGS 630, according to an embodiment of the disclosure. The WWBGS 630 operates in a similar manner to the WWBGS 130 of FIGS. 1 and 2 with a plurality of posts 632; however, WWBGS 630 of FIG. 6 includes posts 632A that have been moved from a periodic location inwardly towards the defect cavity 636 to enhance the concentration of energy in the defect cavity 636. This has been shown with dashed lines 632b, which represents the next expected periodic location. In particular embodiments, this configuration enhances the heightened amplitude water wave in the defect area.

An energy generating system (not seen in this FIGURE) may be placed in or proximate to the defect cavity 636.

It will be understood that well known processes have not been described in detail and have been omitted for brevity. Although specific structures and materials have been described, the present disclosure may not be limited to these specifics, and others may be substituted as it is well understood by those skilled in the art, and various steps may not necessarily be performed in the sequences shown.

It may be advantageous to set forth definitions of certain, words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A water wave energy harvesting system comprising:
a water wave band gap structure (WWBGS) having an array of posts, the WWBGS having one or more defect cavities, each of the one or more defect cavities being at least one missing post within the array, the one or more defect cavities configured to concentrate energy of the water waves, wherein at least one of: the array of posts is periodic with substantially equal distances between posts, and the posts in the array are arranged in multiple dimensions.

2. The water wave energy harvesting system of claim 1, wherein one or more of the posts adjacent at least one of the one or more defect cavities is located at an inward distance towards the defect cavity from an expected periodic location of the post.

3. The water wave energy harvesting system of claim 1, wherein the WWBGS yields a water wave at a location of at least one of the one or more defect cavities that has an amplitude that is four times as high as a nominal amplitude of the water waves surrounding the WWBGS.

4. The water wave energy harvesting system of claim 1, further comprising:
one or more energy conversion devices, each of the one or more energy conversion devices positioned in or adjacent to one of the one or more defect cavities, the one or more energy conversion devices configured to convert the energy from the water waves into another form of energy.

5. The water wave energy harvesting system of claim 1, further comprising:
a waveguide configured to direct water waves through the array adjacent the one or more defect cavities.

6. A water wave energy harvesting system comprising:
a water wave band gap structure (WWBGS) having one or more defect cavities, the one or more defect cavities configured to concentrate energy of the water waves, each of the one or more defect cavities defined by one or more missing posts from a plurality of posts, wherein the plurality of posts are arranged in:
a periodic manner with substantially equal distances between posts, and
multiple dimensions.

7. The water wave energy harvesting system of claim 6, wherein:
the WWBGS comprises an array of posts including the plurality of posts, and
each of the one or more defect cavities is one or more missing posts within the array.

8. The water wave energy harvesting system of claim 7, wherein the array of posts is periodic.

9. The water wave energy harvesting system of claim 8, wherein:
one or more of the posts adjacent at least one of the one or more defect cavities is located at an inward distance towards the defect cavity from an expected periodic location of the post.

10. The water wave energy harvesting system of claim 6, wherein the WWBGS yields a water wave at a location of at least one of the one or more defect cavities that has an amplitude that is four times as high as a nominal amplitude of the water waves surrounding the WWBGS.

11. The water wave energy harvesting system of claim 6, wherein the WWBGS yields an energy concentration at a location of the one or more defect cavities that is more than two times the energy concentration at the same location absent the one or more defect cavities.

12. The water wave energy harvesting system of claim 6, further comprising:
one or more energy conversion devices, each of the one or more energy conversion devices positioned in or adjacent to one of the one or more defect cavities, the one or more energy conversion devices configured to convert the energy from the water waves into another form of energy.

13. The water wave energy harvesting system of claim 7, further comprising:
a waveguide configured to direct water waves through the array adjacent the one or more defect cavities.

14. A water wave energy harvesting system comprising:
an array of periodic posts having a defect cavity and having substantially equal distances between posts, the defect cavity comprising a missing post at an expected periodic location for a post, the defect cavity configured to concentrate energy of the water waves introduced into the array.

15. The water wave energy harvesting system of claim 14, wherein:

the array of periodic posts is configured to be placed in a body of water; and each of the periodic posts extends from a structure that contains the water up out of the water.

16. The water wave energy harvesting system of claim 14, further comprising:

an energy conversion device configured to be positioned in or adjacent the defect cavity, the energy conversion device configured to convert the energy from the water waves into another form of energy.

17. The water wave energy harvesting system of claim 14, wherein one or more of the posts adjacent the defect cavity is located at an inward distance towards the defect cavity from an expected periodic location of the post.

18. The water wave energy harvesting system of claim 14, wherein the array and the defect cavity together yield a wave at a location of the defect cavity that has an amplitude that is four times as high as a nominal amplitude of the waves surrounding the array and the defect cavity.

19. The water wave energy harvesting system of claim 14, wherein the array and the defect cavity together yield an energy concentration at a location of the defect cavity that is more than two times the energy concentration at the same location absent the defect cavity.

20. The water wave energy harvesting system of claim 14, further comprising:

a waveguide configured to direct the water waves through the array adjacent the defect cavity.

\* \* \* \* \*